United States Patent
Sohn et al.

(10) Patent No.: US 6,693,705 B2
(45) Date of Patent: Feb. 17, 2004

(54) APPARATUS FOR MEASURING SLANT ANGLE OF SOLID IMMERSION LENS

(75) Inventors: Yeung Joon Sohn, Daejon-Shi (KR); Gee Pyeong Han, Daejon-Shi (KR); Yark Yeon Kim, Daejon-Shi (KR); Tae Youb Kim, Seoul-Shi (KR); Mun Cheol Paek, Daejon-Shi (KR); Kyoung Ik Cho, Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 59 days.

(21) Appl. No.: 10/163,135

(22) Filed: Jun. 4, 2002

(65) Prior Publication Data

US 2003/0123053 A1 Jul. 3, 2003

(30) Foreign Application Priority Data

Dec. 28, 2001 (KR) .......................................... 2001-86835

(51) Int. Cl.[7] ............................. G01B 9/00; G01N 21/00
(52) U.S. Cl. ........................................ 356/124; 356/614
(58) Field of Search ................................. 356/124–128, 356/614, 615; 369/44.23, 44.14, 44.25, 44.12

(56) References Cited

U.S. PATENT DOCUMENTS

| | | | | |
|---|---|---|---|---|
| 5,553,052 A | * | 9/1996 | Oono et al. ............ | 369/112.17 |
| 5,917,599 A | * | 6/1999 | Nishikawa et al. ......... | 356/510 |
| 6,292,442 B1 | | 9/2001 | Kasono | |
| 6,373,578 B1 | * | 4/2002 | Nishikawa ................... | 356/515 |
| 6,606,159 B1 | * | 8/2003 | Hill ............................. | 356/491 |
| 2002/0113958 A1 | * | 8/2002 | Wilsher et al. .......... | 356/237.2 |

FOREIGN PATENT DOCUMENTS

EP         1052627 A1        11/2000

OTHER PUBLICATIONS

1994 American Institute of Physics, "Near–field optical data storage using a solid immersion lens", B, D. Terris, et al., 3 pages.

* cited by examiner

*Primary Examiner*—Michael P. Stafira
(74) *Attorney, Agent, or Firm*—Blakely, Sokoloff, Taylor & Zafman

(57) ABSTRACT

The present invention relates to an apparatus for measuring a slant angle in a solid immersion lens. In a near-field optical data storage head for storing/reading data using a solid immersion lens (SIL), a parallel light is formed within the plane of the solid immersion lens and the slant angle of the parallel light is then measured using the angle measurement principle of the autocollimator in order to measure the slant angle of the solid immersion lens. For this, the present invention includes an optical system for generating the parallel light within the solid immersion lens, and a unit for measuring the slant angle of the solid immersion lens using a location detection unit. An incident light becomes the parallel light by the optical system and the curved face of the solid immersion lens. The reflected light is also focused on the location detection unit. The location detection unit converts the reflection angle of the reflecting light into a location value to calculate the angle value.

3 Claims, 3 Drawing Sheets

APPARATUS FOR MEASURING SLANT ANGLE OF SOLID IMMERSION LENS

BACKGROUND OF THE INVENTION

1. Field of the Invention

The invention relates generally to an apparatus for measuring a slant angle in a solid immersion lens, and more particularly to, an apparatus for measuring a slant angle in a solid immersion lens capable of measuring an inclination of the solid immersion lens which is a core element in a near-field optical data storage head for storing/reading data using the immersion lens.

2. Description of the Prior Art

A focusing control unit in a near-field data storage unit using a conventional solid immersion lens obtains a focus signal by comparing the light internally totally reflected from the plane of the solid immersion lens and the intensity of the reference light. In case that the solid immersion lens is inclined against an optical axis, however, it may occur an error in detected focus signals since the location where the internally total reflection occurs is changed. Therefore, it is essential to detect whether the solid immersion lens is inclined against the optical axis and then the signal detection against the inclination and the focus signal should be detected.

FIG. 1 shows a focusing control unit in a near-field data storage head using a solid immersion lens.

Referring now to FIG. 1, a focusing control unit in a near-field data storage unit using an solid immersion lens includes a solid immersion lens 104, a polarized light splitter 101 for generating a reference light 111 and a signal light 112 from an incident light 110, a first photodetector 107 for measuring the intensity of the reference light 111, and a second photodetector 109 for measuring the intensity of the signal light 112 totally reflected from an internal side of the solid immersion lens 104.

Further, a first focusing lens 106 is installed between the polarized light splitter 101 and a first photodetector 107, and a second focusing lens 108 is also installed between the polarized light splitter 101 and the second photodetector 109. A ¼ wave plate 102 and a third focusing lens 103 are sequentially installed between the polarized light splitter 101 and the solid immersion lens 104.

If the incident light 110 is incident to the polarized light splitter 101, the polarized light splitter 101 generates the reference light 111 and the signal light 112. The reference light 111 is incident to the first photodetector 107 via the first focusing lens 106 and the first photodetector 107 detects the intensity of the reference light 111. Meanwhile, the signal light 112 is incident to the solid immersion lens 104 via the ¼ wave plate 102 and the third focusing lens 103. The incident signal light 112 is then totally reflected within the solid immersion lens 104 and then returns to the polarized light splitter 101 via the third focusing lens 103 and the ¼ wave plate 102. The totally reflected signal light 112a is incident to the second photodetector 109 via the second focusing lens 108 and the second photodetector 109 detects the intensity of the totally reflected signal light 112a.

As such, the reference light 111 and the totally reflected signal light 112a are compared to produce a focus signal. At this time, the value of the focus signal can be obtained based on below mathematical equation 1:

$$x = p/q \qquad \text{[Equation 1]}$$

where p indicates the intensity of the reference light and q indicates the intensity of the totally reflected signal light.

However, if the solid immersion lens 104 is inclined against to the optical axis, the location of the focus is varied and it thus occurs an error in an erroneous focus signal.

SUMMARY OF THE INVENTION

The present invention is contrived to solve the above problems and an object of the present invention is to provide an apparatus for measuring a slant angle in an solid immersion lens capable of preventing generation of an error in the focus signal by statistically measuring the inclination degree of the solid immersion lens based on the bottom using the principle of an autocollimator.

In order to accomplish the above-mentioned object, an apparatus for measuring a slant angle in an solid immersion lens according to the present invention, is characterized in that it comprises an optical generating unit for generating light to be incident to a solid immersion lens made of a hemispherical shape; a focusing lens for focusing the light reflected from a reflecting face below the solid immersion lens; and a detecting means for measuring the inclination of the solid immersion lens depending on a focus of the light focused by the focusing lens.

Further, the apparatus for measuring the slant angle in the solid immersion lens further includes an optical splitter for making incident the light generated from the optical generating unit to the focusing lens and making parallel the light within the solid immersion lens.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
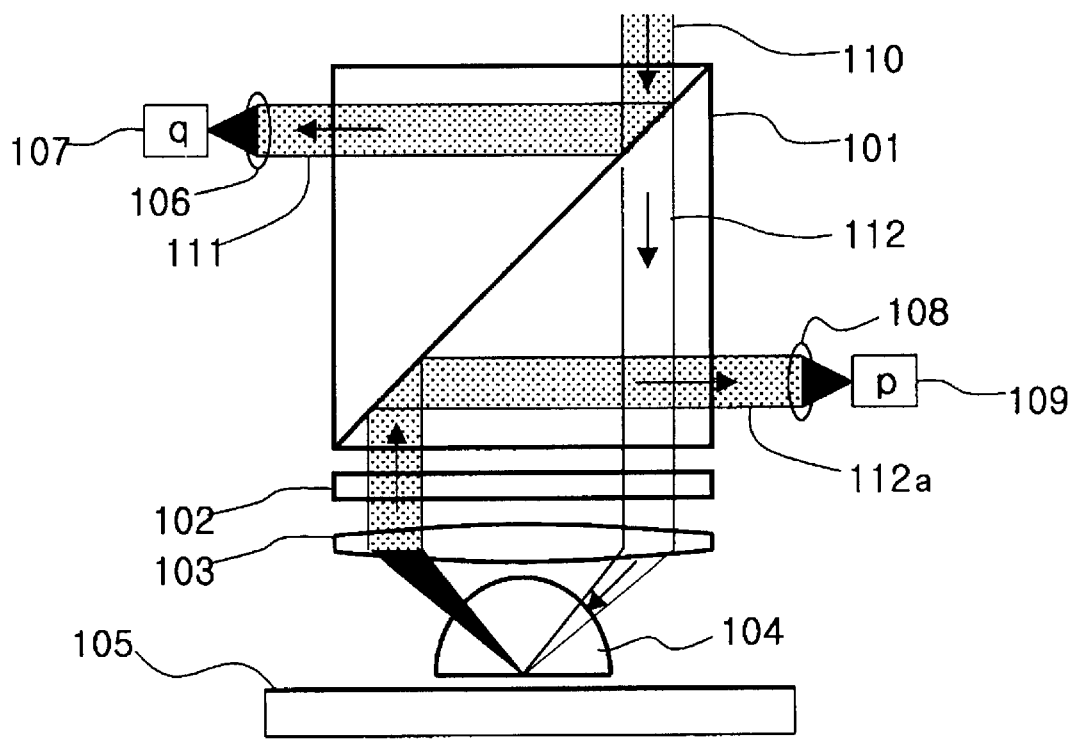
FIG. 1 shows a focusing control unit in a near-field data storage head using a solid immersion lens.

The present invention will be described in detail by way of a preferred embodiment with reference to accompanying drawings, in which like reference numerals are used to identify the same or similar parts.

Figure 2:
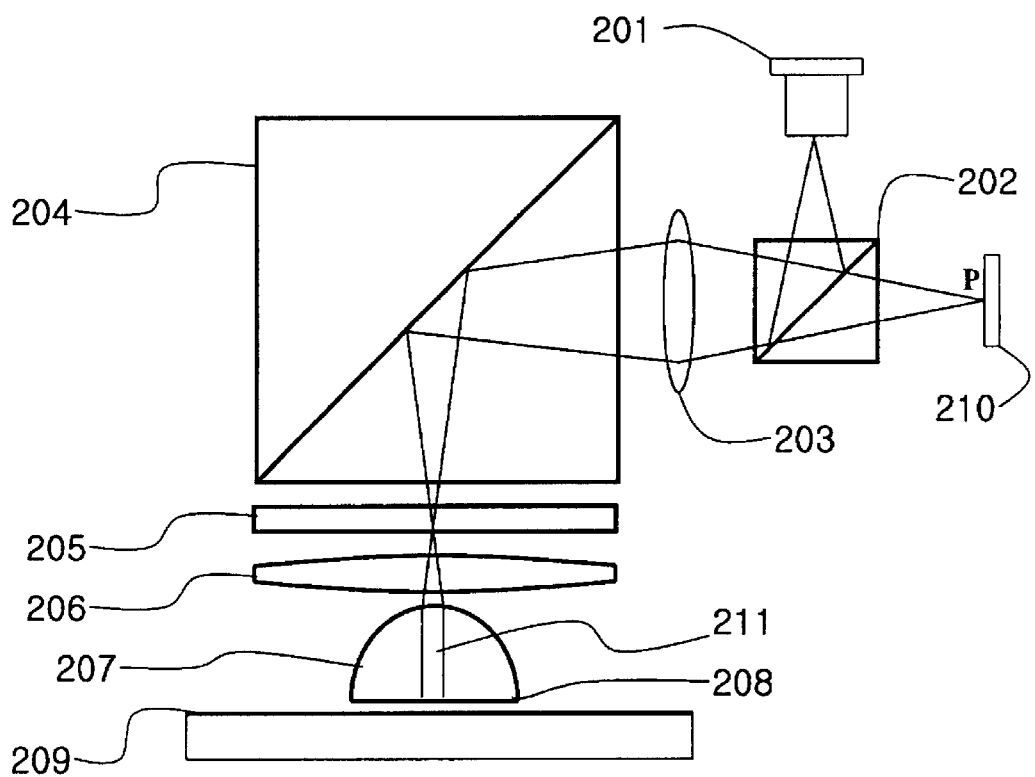
FIG. 2 shows a structure and a operation of an apparatus for measuring a slant angle in a solid immersion lens according to the present invention.

FIG. 2 shows a structure and a operation of an apparatus for measuring a slant angle in a solid immersion lens according to the present invention; and Referring now to FIG. 2, the apparatus for measuring the slant angle in the solid immersion lens includes an optical source 201 for generating light to be incident to a solid immersion lens 211 of a hemispherical shape, a first focusing lens 203 for focusing the light reflected from a reflecting face 208 below a solid immersion lens 211, and a location detection unit 210 for measuring the inclination of the solid immersion lens 211 depending on the focus of the light focused by the first focusing lens 203. The apparatus further includes a light splitter 202 for transmitting the light generated from the optical source 201 to the first focusing lens 203 and making the light travel parallel within the solid immersion lens 211.

The optical source 201 may be a laser diode and the solid immersion lens 207 is installed over a storage medium 209.

The light generated from the optical source 201 is incident to the reflecting face 208 of the solid immersion lens 207 as a parallel light 211 through the light splitter 202, the first focusing lens 203, the polarized light splitter 204, the ¼ wave plate 205 and the second focusing lens 206. Thereafter, the reflected light is focused by the first focusing lens 203, and then the focus of the reflected light is formed at a location 'P' of the location detection unit 210 through the optical splitter 202. The inclination of the reflecting face 208 in the solid immersion lens 211 can be detected depending on the location of the focus. At this time, the location detection unit 210 is made of a plane and is detected in a two dimension against the vertical direction of the incident optical axis.

At this time, the value of the focus location of the incident light detected by the location detection unit 210 is proportional to the inclination value of the reflecting face 208 in the solid immersion lens 207.

Figure 3:
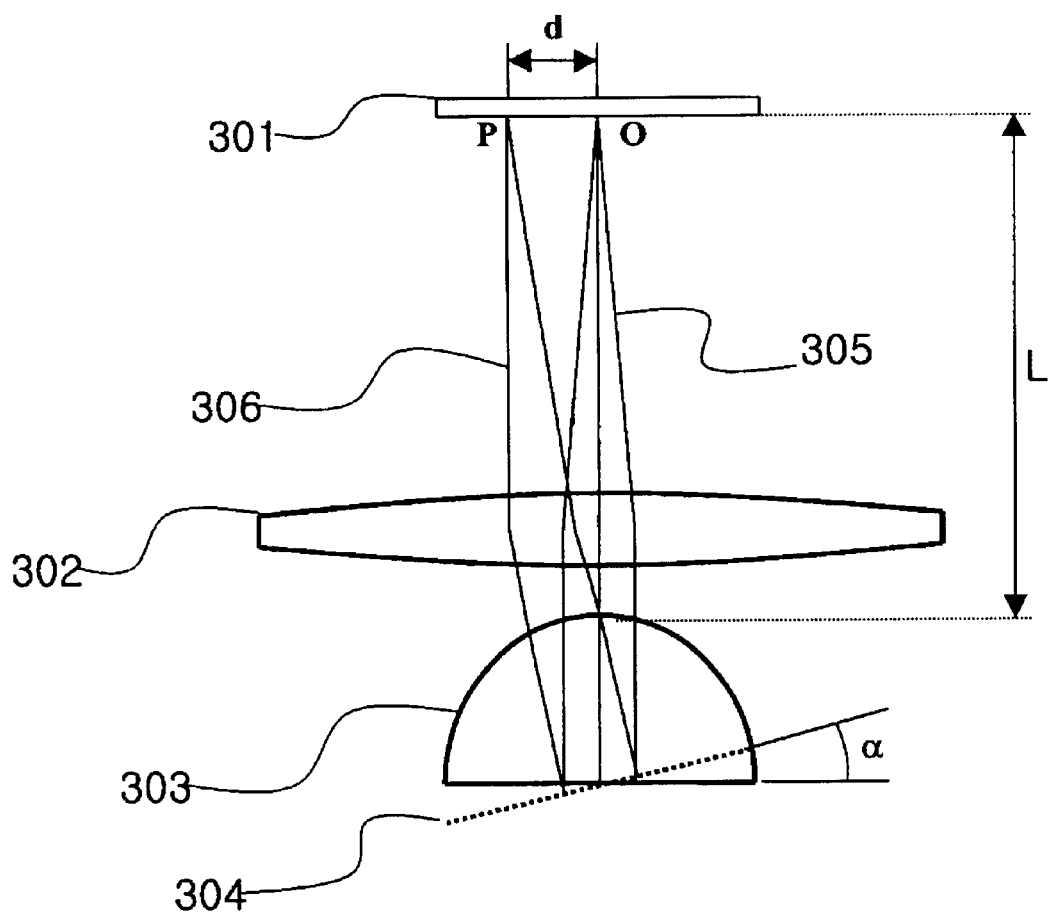
FIG. 3 is a conceptual diagram for describing the operating principle of the apparatus for measuring the slant angle in the solid immersion lens shown in FIG. 2.

FIG. 3 is a conceptual diagram for describing the operating principle of the apparatus for measuring the slant angle in the solid immersion lens shown in FIG. 2.

Referring now to FIG. 3, if the inclination of a reflecting face 304 in a solid immersion lens 303 is 0°, the absolute value of the focus location of a first reflecting light 305 focused on the location detection unit 301 by a focusing lens 302 is 'O'. Meanwhile, if the inclination of the reflecting face 304 is a 'α' angle, the absolute value P of the focus location of the first reflecting light 305 focused on the location detection unit 301 by the focusing lens 302 is 'P'.

Therefore, an inclination 'α' of the solid immersion lens 303 could be known by measuring the distance d between P and O. If the angle is too small, the inclination value can be obtained by below mathematical equation 2.

$$\alpha \approx \kappa(d/2L) \qquad \text{[Equation 2]}$$

where, k indicates the constant that is determined by a structure of an optical system including a solid immersion lens and lenses for forming a parallel light. The above Equation 2 can be applied to the two-dimensional inclination of the solid immersion lens.

As the inclination of the solid immersion lens could be obtained based on the Equation 2, the inclination of the solid immersion lens 303 could be corrected.

As mentioned above, the present invention has an outstanding effect that it can exactly form a focus to be focused on a solid immersion lens, by exactly measuring the inclination of the solid immersion lens and then correcting the inclination of the measured value.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. An apparatus for measuring a slant angle in a solid immersion lens, comprising:

optical source for generating light to be incident to a solid immersion lens made of a hemispherical shape;

a focusing lens for focusing the light reflected from a reflecting face below said solid immersion lens; and a detecting means for measuring the inclination of said solid immersion lens depending on a focus of the light focused by said focusing lens.

2. The apparatus as claimed in claim 1, further comprising an optical splitter for transmitting the light generated from said optical source to said focusing lens and making the light travel parallel within said solid immersion lens.

3. The apparatus as claimed in claim 1, said optical source is a laser diode.

* * * * *